United States Patent [19]

Tamura et al.

[11] Patent Number: 4,681,347
[45] Date of Patent: Jul. 21, 1987

[54] AUTOMATIC SEATBELT APPARATUS

[75] Inventors: Keiichi Tamura; Yuji Nishimura; Takashi Kawaharazaki, all of Aichi, Japan

[73] Assignee: Kabushiki Kaisha Tokai-Rika-Denki-Seisakusho, Aichi, Japan

[21] Appl. No.: 903,246

[22] Filed: Sep. 3, 1986

[30] Foreign Application Priority Data

Sep. 4, 1985 [JP] Japan .................. 60-135251[U]

[51] Int. Cl.[4] .......................................... B60R 22/06
[52] U.S. Cl. .................................. 280/804; 280/808
[58] Field of Search .............. 280/801, 802, 804, 808; 297/469

[56] References Cited

U.S. PATENT DOCUMENTS

| 4,394,036 | 7/1983 | Hildebrandt | 280/804 |
| 4,436,323 | 3/1984 | Yamamoto | 280/804 |
| 4,456,283 | 6/1984 | Michael et al. | 280/804 |
| 4,555,127 | 11/1985 | Kawai | 280/804 |
| 4,597,588 | 7/1986 | Kawai | 280/804 |
| 4,607,863 | 8/1986 | Yokote | 280/804 |

FOREIGN PATENT DOCUMENTS

28552 9/1980 Japan .

Primary Examiner—John J. Love
Assistant Examiner—Ross Weaver
Attorney, Agent, or Firm—Sixbey, Friedman & Leedom

[57] ABSTRACT

Disclosed is an automatic seatbelt apparatus which is capable of automatically applying, or canceling the application of, a webbing around an applicant of a vehicle as a slider to which one end of the webbing is retained along a guide rail disposed in the vicinity of the roof of the vehicle is moved in the longitudinal direction of the vehicle via a flexible elongated member driven by the driving force of a driving means. A switch, when located in its webbing-application position, is adapted to stop a motor by detecting the application of the webbing and is so disposed at this time as to be capable of moving in accordance with the bending of a flexible guide member. Accordingly, since the switch can be moved when the guide member bends, the webbing-application position can be altered even in the webbing-applied state.

21 Claims, 7 Drawing Figures

AUTOMATIC SEATBELT APPARATUS

BACKGROUND OF THE INVENTION

1. Field of the Invention

The present invention relates to an automatic seatbelt apparatus which allows an occupant of a vehicle to have a webbing automatically applied to himself after being seated, and more particularly to an automatic seatbelt apparatus which allows the stopping position of a slider to be altered in accordance with the physical build of the occupant.

2. Description of the Prior Art

Heretofore, a proposal has been made with respect to an automatic seatbelt apparatus which is capable of automatically applying, or canceling the application of, a webbing around an occupant of a vehicle (Japanese Utility Model Laid-Open No. 28552/1980.

The aforementioned automatic seatbelt apparatus is arranged such that one end of a webbing, the other end of which has been wound up by a takeup device installed in the central portion of a vehicle, is engaged in a slider which is capable of moving toward the front or rear of the vehicle along a guide rail disposed in the vicinity of the roof of the vehicle, thereby applying the webbing or canceling the application of the same by moving the slider.

More specifically, in a case where the slider has been moved to the end of the guide rail which is at the forward end of the vehicle, a space allowing the occupant to enter the vehicle is created between the intermediate portion of the webbing and a seat. When the occupant is seated on the seat, the slider moves to the vehicle rear end of the guide rail, thereby causing the webbing to be applied.

The stopping position of the slider which corresponds with this webbing-application state is detected by, a limit switch so as to stop the slider. This limit switch is retained at a predetermined position (a position suited to an occupant of average build) on the guide rail, so that there are cases where such an automatic seatbelt apparatus fails to assume an optimum webbing-applied state when an occupant with a different type of build enters the vehicle.

To overcome this problem, it is conceivable that an automatic seatbelt apparatus could be devised in which the retaining position of the limit switch is made changeable. Thus, if the position of the limit switch were adjusted in advance to suit the body of the individual occupant, an optimum webbing-applied state could be obtained.

With such a construction, however, the adjustment of the retaining position of the slider is possible only when the slider is disposed at the forward position of the guide rail, and adjustment thereof at the webbing-applied position could be impossible. For this reason, in order to obtain an optimally adjusted position, it is necessary to move the slider back and forth a number of times, which presents the problem of poor operating efficiency.

SUMMARY OF THE INVENTION

In view of the above-described fact, it is a primary object of the present invention to provide an automatic seatbelt apparatus which is capable of adjusting the slider-retaining position at the webbing-applied position.

To this end, the invention provides an automatic seatbelt apparatus which is capable of automatically applying, or canceling the application of, a webbing around an occupant of a vehicle, comprising: (a) a guide rail disposed in the vicinity of the roof of a vehicle such as to extend in the longitudinal direction of the vehicle; (b) a slider by which one end of the webbing is retained and which is capable of moving along the guide rail; (c) a flexible elongated member for moving the slider along the guide rail toward the front or rear of the vehicle between a webbing-application position and a webbing application-canceling position; (d) a driving means for driving the flexible elongated member by imparting a driving force to the same such as to move the slider; (e) a flexible guide member disposed between the driving means and the guide rail and accommodating a part of the flexible elongated member; (f) a detecting means which moves in response to the bending of the guide member and is adapted to stop the driving means when the slider reaches the webbing-application position; and (g) a lock means for selectively securing the detecting means at a plurality of predetermined positions in response to the bending of the guide member.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENT

Figure 1:
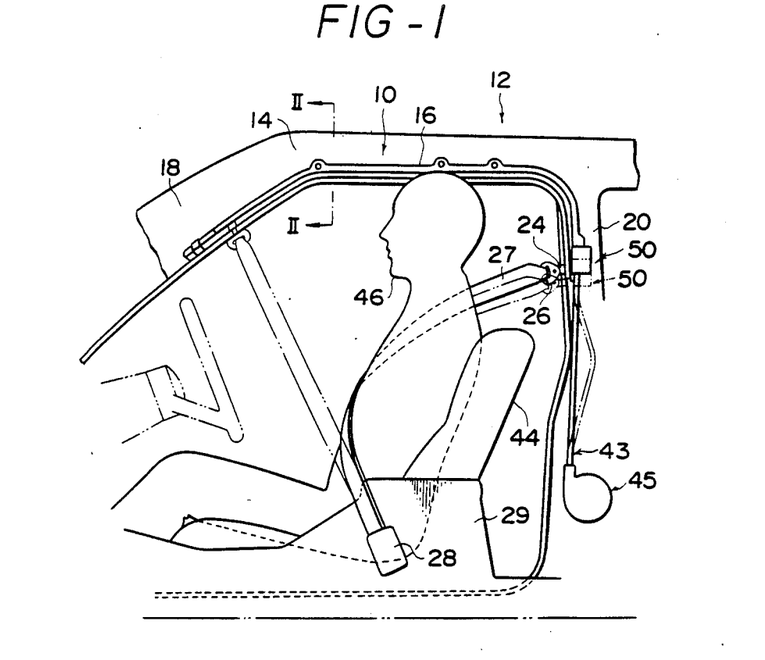
FIG. 1 is a front elevational view of an automatic seatbelt apparatus, as viewed from the side of a vehicle, according to the present invention.

Referring first to FIG. 1, there is shown an automatic seatbelt apparatus 10 embodying the present invention.

A guide rail 16 is installed on the roof side 14 of a vehicle 12.

The tip portion of this guide rail 16 extends along the front pillar 18 of the vehicle 12, while the rear end portion thereof is bent substantially orthogonally along a center pillar 20.

Figure 2:
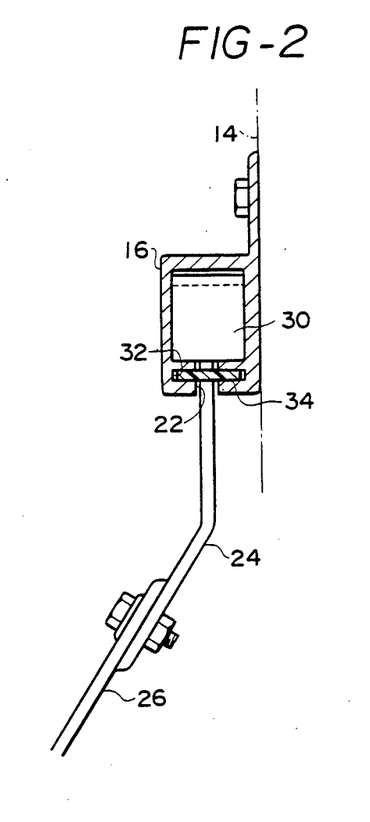
FIG. 2 is a cross-sectional view taken along the line II—II of FIG. 2.

As shown in FIG. 2, a recess 22 is provided on that surface of the guide rail 16 which faces downwardly of the vehicle. A slider 24 is inserted into this recess 22, and one end of a webbing 27 is retained thereby via a coupling member 26.

The other end portion of the webbing 27 is, after being taken up, accommodated in a takeup device 28 disposed in the central portion of the vehicle. This takeup device 28 is secured inside a center console 29 to the chassis.

An inertia lock mechanism, which, at the time of a vehicular emergency, is capable of detecting the same by means of an acceleration sensor and instantly prevents the withdrawal of the webbing 27, is incorporated in the takeup device 28.

Figure 3:
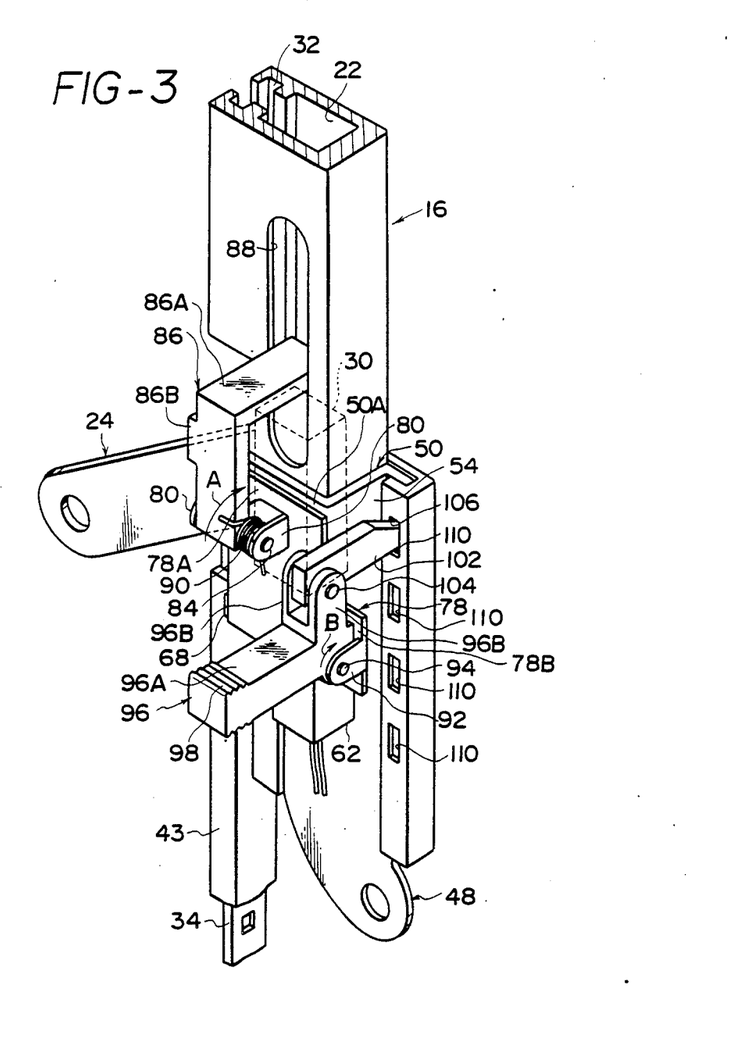
FIG. 3 is an enlarged perspective view of the vehicle rear end portion of a guide rail.

As also shown in FIGS. 2 and 3, the bottom of the recess 22 of the guide rail 16 has an expanded diameter so as to accommodate a head 30 formed at the tip of the slider 24. Furthermore, a tape accommodating recess 32 is formed in the intermediate portion of the recess 22, and an elongated flexible tape 34 is disposed therein.

Figure 4:
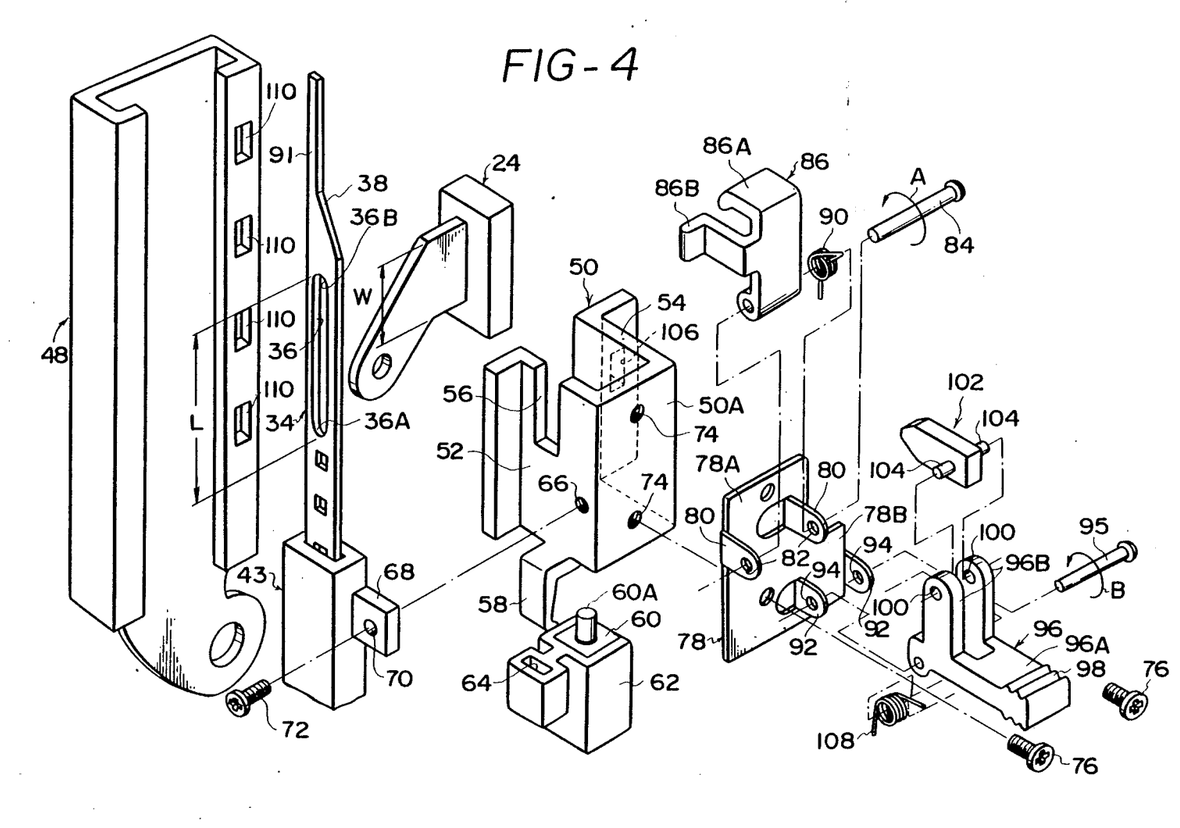
FIG. 4 is an exploded perspective view of the vehicle rear end portion of the guide rail.

As shown in FIG. 4, an elongated hole 36 is provided at the tip portion of this flexible tape 34, and an intermediate portion of the slider 24 is inserted therethrough. In addition, a slanting portion 38 is formed at the tip of the flexible tape 34.

The rear end portion of the flexible tape 34 passes through a tape guide rail 43, which is a guide member extending along the tape accommodating recess 32 of the guide rail 16 and is disposed at the rear end portion of the guide rail 16, and is taken up by the takeup reel (not shown) of a drive means 45 (FIG. 1).

Figure 5A:
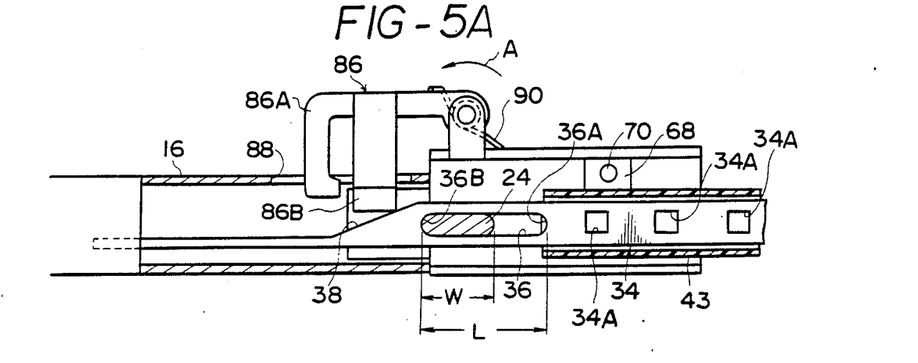
FIGS. 5(A) to (C) are explanatory diagrams illustrating the inner structure of the vehicle rear end portion of the guide rail.
Figure 5B:
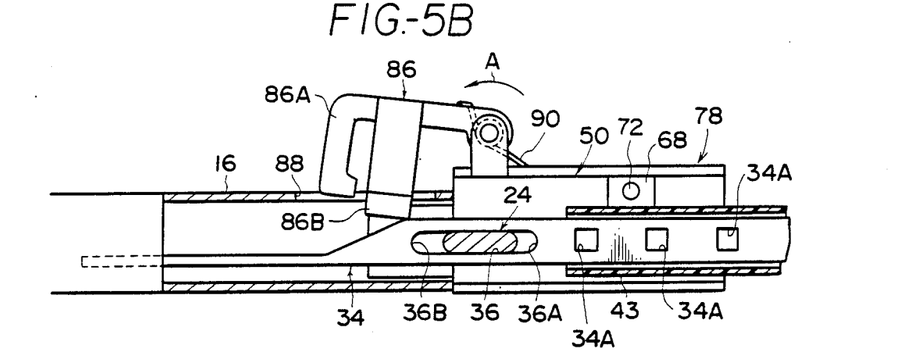
Figure 5C:
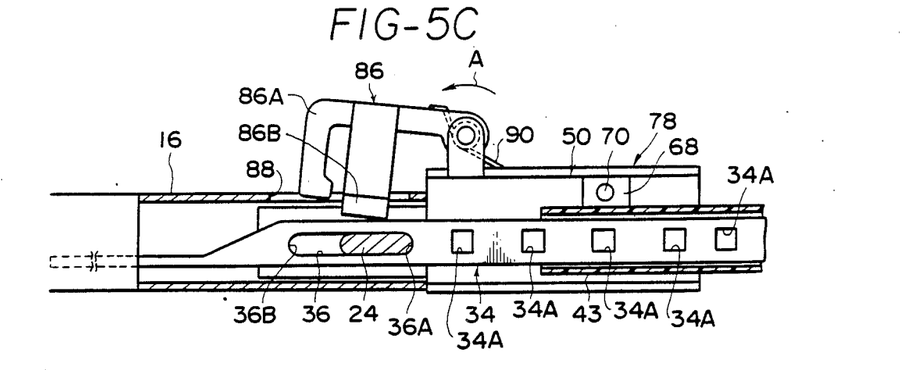

As for this flexible tape 34, a plurality of square holes 34A are formed at predetermined intervals along the longitudinal direction thereof (refer to FIG. 5), and each of these square holes 34A is adapted to be engaged and driven by a sprocket rotated by the rotational force of a motor or the like serving as the drive means 45.

As a result, when the drive means 45 is rotated forwardly, a compressive force is generated in the flexible tape 34 inside the tape guide rail 43, which causes the flexible tape 34 to move in the forward direction of the vehicle through the tape accommodating recess 32. On the other hand, when the drive means 45 is rotated in reverse, a tensile force is generated in the tape guide rail 43, thereby moving the flexible tape 34 in the rearward direction of the vehicle.

Furthermore, the tape guide rail 43 is flexible, and is adapted such that its intermediate portion can be bent as the tape guide rail 43 bends when its upper end portion is moved vertically, as shown by an alternate long and two short dashes line in FIG. 1. In this case, since the flexible tape 34 also bends, the arrangement is such that the relative positions of the flexible tape 34 and the tape guide rail 43 will not change.

The longitudinal dimension (L) of the elongated hole 36 of the flexible tape 34 is longer than the width (W) of the slider 24 inserted therethrough and is arranged such that a slight time lag will be created in the movement starting time of the slider 24 relative to the movement starting time of the flexible tape 34 by the margin of this dimensional difference.

In other words, in the case of movement of the flexible tape 34 in the forward direction of the vehicle, the slider 24 is pressed by the vehicle rear-side end portion 36A of the elongated hole 36, while, in the case of movement of the flexible tape 34 in the rearward direction of the vehicle, the slider 24 is pressed by the vehicle foward-side end portion 36B.

With this structure, when the slider 24 has been moved to the vehicle forward end portion of the guide rail, a space is created between the webbing 27 and a seat 44 (refer to the broken lines in FIG. 1), so that an occupant 46 can easily seat himself on the seat 44.

In addition, if, in this state, the slider 24 is moved to the vehicle rear end portion of the guide rail 16, the occupant 46 is able to apply the webbing.

FIG. 3 shows a state in which the slider 24 has been moved to the rear end portion of the guide rail 16.

A reinforcemen 48 is fitted around the outer periphery of the rear end portion of the guide rail 16 and is secured to the vehicle body.

Both of transverse edge portions of this reinforcement 48 are bent into a substantially U-shape with their edge surfaces opposed to each other, to retain the guide rail 16.

In addition, a holder 50 is disposed slidably around the outer periphery of the guide rail 16.

As also shown in FIG. 4, leg plates 52 and 54, which are both bent so as to be parallel to transverse edge portions, are formed in the holder 50. Furthermore, tip portions thereof are bent away from each other, and are inserted into the inside of the substantially U-shaped bent portions of the reinforcement 48.

Accordingly, the holder is adapted so as to be capable of sliding along the guide rail 16 in the longitudinal direction thereof, without coming off.

A notch 56 is provided in the leg plate 52 of the holder 48, and the slider 24 is adapted to be accommodated in this notch 56 when the webbing is applied.

Furthermore, an engaging claw 58 which extends downwardly is formed integrally with the lower end portion (see FIG. 4) of the holder 50, and is inserted into and secured to an engagement hole 64 of a switch holder 62 in which a limit switch 6, i.e., a detecting means, is fitted.

Thus, the arrangement is such that a moving member 60A of a limit switch 60 is disposed inside the holder 50, and, when the slider 24 is accommodated in the notch 56, the limit switch 60 detects that the slider 24 has reached a webbing-application position because the slider 24 presses the moving member 60A, thereby stopping the drive of a driving means 45.

A female threaded portion 66 is formed in the leg plate 52 of the holder 50, and a screw 72, which is inserted through a circular hole 70 of a flange 68 formed at the upper end portion of the tape guide rail 43, is screwed into the female threaded portion 66.

Thus, the tape guide rail 43 is adapted so as to follow the holder 50 when the holder 50 is moved.

Two female threaded portions 74 are formed in a base portion 50A of the holder 50, and a bracket 78 is secured thereto by means of screws 76.

The bracket 78 is substantially L-shaped, and an upper portion thereof (a narrow width portion 78A) (see FIG. 4) has the same dimension as the width of the base pertion 50A of the holder 50, while a lower portion thereof (an extended portion 78B) extends toward the leg plate 54 (right-hand side in FIG. 4) of the holder 50.

Mutually parallel flanges 80 are formed in the narrow width portion 78A so as to project therefrom away from the holder 50, and eyelet pin 84 is made to pass through circular holes 82 provided respectively in the flanges 80, and the end of the eyelet pin 84 is caulked. An anchor lock arm 86, which is an engaging means, is pivotally supported by an intermediate portion of this eyelet pin 84.

A longitudinal tip portion of the anchor lock arm 86 is bent orthogonally toward the guide rail 16 to form a lock portion 86A. A corresponding elongated hole 88, through which the lock portion 86A can penetrate into the guide rail 16, is provided in the guide rail 16. In addition, a torsion coil spring 90 is provided around the eyelet pin 84, one end portion thereof being engaged with the anchor lock arm 86 and the other end portion thereof being engaged with the bracket 78 so as to urge the anchor lock arm 86 in the direction of an arrow A in FIG. 4. Accordingly, the lock portion 86A is normally inserted into the elongated hole 88.

A substantialy L-shaped claw 86B is integrally formed on one transverse edge portion (left-hand side in FIG. 4) of the anchor lock arm 86.

This claw 86B is so adapted that it is disposed on the path of the flexible tape 34 between the tape guide rail 43 and the guide rail 16 when the anchor lock arm 86 rotates in the direction of the arrow A in FIG. 4. Moreover, when the flexible tape 34 moves upwardly along this path, as viewed in FIG. 4, the aforementioned slanting portion 38 interferes with the claw 86B, thereby pressing the claw 86B to rotate the anchor lock arm 86 in the direction opposite to the arrow A in FIG. 4, against the urging force of the torsion coil spring 90.

Thus, the lock portion 86A is adapted to be disengaged from the elongated hole 88 at the same time that the claw 86B finishes climbing the slanting portion 38.

A narrow guide portion 91 extends from the end of the flexible tape 34 to span the gap between the tape guide rail 43 and the guide rail 16, so that the flexible tape 34 is positively guided into the guide rail 16 when it moves in the forward direction of the vehicle.

In addition, flanges 92 of the same configuration as that of the flanges 80 formed in the narrow width portion 78A are formed in the extended portion 78B of the bracket 78 so as to protrude therefrom, and are provided with concentric circular holes 94, respectively.

An eyelet pin 95 passes through these circular holes 94, and the end portion thereof is caulked.

An adjustment lever 96 is pivotally supported by an intermediate portion of the eyelet pin 95. This adjustment lever 96 has extended portions 96A, 96B which extend substantially orthogonally to each other from a pivotal support portion as a start point, so that it has a substantially L-shaped configuration.

A wave-shaped portion 98 is formed at the end portion of the extended portion 96A and serves as an operating portion for rotation about the eyelet pin 95 as a center.

A transverse intermediate portion of the extended portion 96B is notched to make make the extended portion 96B into a pair of leg plates parallel to each other, and circular holes 100 are provided respectively in the end portions thereof.

Axial pins 104 formed on a lock bar 102 are axially supported by the circular holes 100.

The lock bar 102 corresponds to a square hole 106 provided in the holder 50. Accordingly, when the adjustment lever 96 has rotated in the direction of an arrow B in FIG. 4, the lock bar 102 is adapted to penetrate into the square hole 106. Incidentally, since a torsion coil spring 108 is provided around the eyelet pin 95 so as to urge the adjustment lever 96 to rotate in the direction of the arrow B in FIG. 4, the lock bar 102 is normally retained penetrating the square hole 106.

A plurality of square holes 110 (see FIG. 3) are provided in the reinforcement 48 to correspond with the square hole 106, and the lock bar 102 is adapted to be partially inserted into each of these square holes 110. With this structure, if the operating portion, i.e., the extended portion 96A, is operated, and the adjustment lever 96 is thereby rotated in the direction opposite to the arrow B in FIG. 4 against the urging force of the torsion coil spring 108, thereby temporarily disengaging the lock bar 102 from the square hole 110, the holder 50 becomes slidable and can be inserted into another square hole 110.

Description will be made hereinafter of the operation of the present embodiment.

When the occupant 46 is about to enter a vehicle, the slider 24 is diposed at the vehicle forward end portion of the guide rail 16, and a space is created between the webbing 27 and the seat 44, so that the occupant is readily able to seat himself on the seat 44.

When the occupant 46 is seated on the seat 44, the driving means 45 is rotated in reverse, causes tension to be generated in the flexible tape 34, and moves the slider 24 along the guide rail 16 toward the rear of the vehicle. In consequence, the occupant is able to have the webbing 27 automatically applied around himself.

When the slider 24 is accommodated in the notch 56 of the holder 50, the slider 24, in this state, comes into contact with the moving member 60A of the limit switch 60 to stop the driving force of the drive means 45, thereby allowing the occupant 46 to assume the webbing applied state.

Simultaneously, the anchor lock arm 86, which had been rotated in the direction opposite to the arrow A in FIG. 4 on the side of the flexible tape 34, is rotated in the direction of the arrow A by means of the urging force of the torsion coil spring 90, which in turn causes the lock portion 86A to be inserted into the elongated hole 88. Thus, the slider 24 can be retained in the holder 50.

Accordingly, the load to which the slider 24 is subjected when, at the time of a vehicular emergency, the acceleration sensor detects the same and the inertia lock mechanism of the takeup device 28 is operated can be positively transmitted to the vehicle body via the holder 50 and the reinforcement 48. Moreover, even when the vehicle is overthrown, the slider 24 can be retained by the lock portion 86A, so that it is possible to maintain the state of restraint imposed on the occupant 46 by means of the webbing 27.

When an occupant having a different build enters this vehicle and the webbing 27 is applied to him, it is possible to change the engaging position of the slider 24 by engaging the lock lever 102 with another square hole 110 after application of the webbing so as to take account of the body size of the new occupant.

To explain this operation more specifically, the operating portion of the adjustment lever 96 is first operated, thereby rotating the adjustment lever 96 in the opposite direction to that of the arrow B in FIG. 4, against the urging force of the torsion coil spring 108.

By this operation, the lock bar 102 is temporarily disengaged from the square hole 110. This allows the holder 50 to be movable vertically as viewed in FIG. 4.

If this holder 50 is manually moved downwardly, the tape guide rail 43 which is retained by the holder 50 follows the same. In this case, since the lower end portion of the tape guide rail 43 is secured to the driving means, the intermediate portion of the tape guide rail 43 is bent, as shown by the alternate long and two short dashes line in FIG. 1. Since the flexible tape 34 is also bent correspondingly, it becomes possible to reduce the height alone without changing the position of engagement between the flexible tape 34 and the sprocket wheel (not shown) inside the driving means 45.

Accordingly, the slider 24 which is inserted in the elongated hole 36 of the flexible tape 34 can also be moved downwardly without any resistance.

At this juncture, if the lock bar 102 is made to correspond to another square hole 110 and the rotatably retaining force of the adjustment lever 96 in the direction opposite to the arrow B is released, the adjustment lever 96 is urged and rotated in the direction of the arrow B by the urging force of the torsion coil spring 108, which in turn causes the lock bar 102 to be inserted into the square hole 110, thereby retaining the holder 50.

A similar operation can be carried out in the case of moving the holder 50 upwardly as well.

Thus, since it is possible to alter the engaging position of the slider 24 in the webbing-applied state to suit the build of an individual occupant, an optimum webbing-applied state can be obtained for occupants having a variety of body sizes.

Next, when the occupant 47 leaves the vehicle after it stops, the slider 24 is moved to the vehicle forward-side end portion of the guide rail 16.

To explain this operation, the driving means first starts rotating, and a compressive force is applied to the flexible tape 34 inside the tape guide rail 43.

As a result, the flexible tape 34 starts moving along the guide rail 16 in the forward direction of the vehicle (see FIG. 5(A)).

At this juncture, the slider 24 abuts against the vehicle foward end portion 36B of the elongated hole 36 of the flexible tape 34, and there is a slight time lag before the movement starts, the margin being the dimensional difference between the longitudinal dimension (L) of the elongated hole 36 and the width (W) of the slider 24.

In other words, when the flexible tape 34 moves, the slanting portion 38 at the tip portion thereof is brought into contact with the claw 86B of the anchor lock arm 86.

Consequently, the anchor lock arm 86 is pressed in the direction opposite to that of the arrow A in FIG. 4, against the urging force of the torsion coil spring 90, thereby making it possible to release the lock portion 86A from the path of the slider 24 (refer to FIG. 5(B)).

When this disengagement is completed, the vehicle rear end portion 36A of the elongated hole 36 is brought into contact with the slider 24, which, in that state, can be pressed and moved to the vehicle forward end portion of the guide rail 16 (refer to FIG. 5(C)).

Thus, since the lock portion 86A of the anchor lock arm 86 can be automatically displaced from the path of the slider 24, it is possible to reduce awkwardness in operation.

What is claimed is:

1. An automatic seatbelt apparatus which is capable of automatically applying, or canceling the application of, a webbing around an occupant of a vehicle, comprising:
   (a) a guide rail disposed in the vicinity of the roof of a vehicle such as to extend in the longitudinal direction of the vehicle;
   (b) a slider by which one end of said webbing is retained and which is capable of moving along said guide rail;
   (c) a flexible elongated member for moving said slider along the guide rail toward the front or rear of the vehicle between a webbing-application position and a webbing application-canceling position;
   (d) a driving means for driving said flexible elongated member by imparting a driving force to the same such as to move said slider;
   (e) a flexible guide member disposed between said driving means and said guide rail and accommodating a part of said flexible elongated member;
   (f) a detecting means which moves in response to the bending of said guide member and is adapted to stop said driving means when said slider reaches said webbing-application position; and
   (g) a lock means for selectively securing said detecting means at a plurality of predetermined positions in response to the bending of said guide member,
   whereby said webbing-application position can be altered even if the occupant is in a webbing-applied state.

2. An automatic seatbelt apparatus according to claim 1, wherein said guide member accommodates said flexible elongated member in the longitudinal direction of said flexible elongated member.

3. An automatic seatbelt apparatus according to claim 2, wherein said detecting means is supported by a holder disposed movably in the vehicle rear end portion of said guide rail.

4. An automatic seatbelt apparatus according to claim 3, wherein said holder supports said vehicle rear end portion of said guide rail and is movably supported in the longitudinal direction of said flexible elongated member by a reinforcement secured to a vehicle body.

5. An automatic seatbelt apparatus according to claim 4, wherein said lock means has a plurality of holes formed in said reinforcement at predetermined intervals in the longitudinal direction of said flexible elongated member, a lock bar which is supported by said holder and is selectively engaged by said plurality of holes, and a first urging means for urging said lock bar in the direction of engagement with said hole.

6. An automatic seatbelt apparatus according to claim 5, wherein said lock means further has an adjustment lever which is pivotally supported by said holder, supports said lock bar, and cancels the engagement between said lock bar and said hole in opposition to the urging force of said first urging means when so operated by the occupant.

7. An automatic seatbelt apparatus according to claim 6, further provided with a movement-preventing means for preventing said slider from moving toward the webbing application-canceling position when said slider is in said webbing-application position.

8. An automatic seatbelt apparatus according to claim 7, wherein said preventing means has an anchor lock arm which is supported by said holder, and is positioned in the path of said slider when said webbing is in said webbing-application position, and a second urging means for urging said anchor lock arm toward the path of said slider.

9. An automatic seatbelt apparatus according to claim 8, wherein a rejecting means is provided for rejecting said anchor lock arm out of the path of said slider in opposition to the urging force of said second urging means.

10. An automatic seatbelt apparatus according to claim 9, wherein the driving force-transmitting portion of said driving means located between said slider and said flexible elongated member has a clearance of a predetermined amount in the longitudinal direction of said flexible elongated member.

11. An automatic seatbelt apparatus according to claim 10, wherein said driving force-transmitting portion is disposed in the vicinity of said vehicle forward end portion of said flexible elongated member, and said rejecting means has an inclined portion connected to a narrow width portion formed in the tip portion of said flexible elongated member, and a claw portion which extends from said anchor lock arm, is positioned in said inclined portion by means of the urging force of said second urging means, and is rejected from the path of said flexible elongated member in opposition to the urging force of said second urging means by virtue of the movement of said flexible elongated member toward the front of the vehicle.

12. An automatic seatbelt apparatus which is capable of automatically applying, or canceling the application of, a webbing around an occupant of a vehicle, comprising:
   (a) a guide rail disposed in the vicinity of the roof of a vehicle such as to extend in the longitudinal direction of the vehicle;
   (b) a slider by which one end of said webbing is retained and which is capable of moving along said guide rail;
   (c) a flexible elongated member for moving said slider along the guide rail toward the front or rear of the vehicle between a webbing-application position and a webbing application-canceling position;
   (d) a driving means for driving said flexible elongated member by imparting a driving force to the same such as to move said slider;
   (e) a flexible guide member disposed between said driving means and said guide rail and accommodating a part of said flexible elongated member located between said driving means and said guide rail;
   (f) a detecting means which moves in response to the bending of said guide member and is adapted to stop said driving means when said slider reaches said webbing-application position;
   (g) a lock means for selectively securing said detecting means at a plurality of predetermined positions in response to the bending of said guide member; and
   (h) a movement preventing means for preventing the movement of said slider toward said webbing application-canceling position when said slider is in said webbing-application position,
   whereby said webbing-application position can be altered even if the occupant is in a webbing-applied state 13. An automatic seatbelt apparatus according to claim 12, wherein said guide member accommodates said flexible elongated member in the longitudinal direction of said flexible elongated member.

14. An automatic seatbelt apparatus according to claim 13, wherein said detecting means is supported by a holder disposed movably in the vehicle rear end portion of said guide rail.

15. An automatic seatbelt apparatus according to claim 14, wherein said holder supports said vehicle rear end portion of said guide rail and is movably supported in the longitudinal direction of said flexible elongated member by a reinforcement secured to a vehicle body.

16. An automatic seatbelt apparatus according to claim 15, wherein said lock means has a plurality of holes formed in said reinforcement at predetermined intervals in the longitudinal direction of said flexible elongated member, a lock bar which is supported by said holder and is selectively engaged by said plurality of holes, and a first urging means for urging said lock bar in the direction of engagement with said hole.

17. An automatic seatbelt apparatus according to claim 16, wherein said lock means further has an adjustment lever which is pivotally supported by said holder, supports said lock bar, and cancels the engagement between said lock bar and said hole in opposition to the urging force of said first urging means when so operated by the occupant.

18. An automatic seatbelt apparatus according to claim 17, wherein said preventing means has an anchor lock arm which is supported by said holder, and is positioned in the path of said slider when said webbing is in said webbing-application position, and a second urging means for urging said anchor lock arm toward the path of said slider.

19. An automatic seatbelt apparatus according to claim 18, wherein a rejecting means is provided for rejecting said anchor lock arm out of the path of said slider in opposition to the urging force of said second urging means.

20. An automatic seatbelt apparatus according to claim 19, wherein the driving force-transmitting portion of said driving means located between said slider and said flexible elongated member has a clearance of a predetermined amount in the longitudinal direction of said flexible elongated member.

21. An automatic seatbelt apparatus according to claim 20, wherein said driving force-transmitting portion is disposed in the vicinity of said vehicle forward end portion of said flexible elongated member, and said rejecting means has an inclined portion connected to a narrow width portion formed in the tip portion of said flexible elongated member, and a claw portion which extends from said anchor lock arm, is positioned in said inclined portion by means of the urging force of said second urging means, and is rejected from the path of said flexible elongated member in opposition to the urging force of said second urging means by virtue of the movement of said flexible elongated member toward the front of the vehicle.

* * * * *